US010083001B2

(12) United States Patent
Ruwisch

(10) Patent No.: US 10,083,001 B2
(45) Date of Patent: Sep. 25, 2018

(54) AUDIO SIGNAL PROCESSOR

(71) Applicant: Dietmar Ruwisch, Berlin (DE)

(72) Inventor: Dietmar Ruwisch, Berlin (DE)

(73) Assignee: RUWISCH, Dietmar, Berlin (DE)

( * ) Notice: Subject to any disclaimer, the term of this patent is extended or adjusted under 35 U.S.C. 154(b) by 0 days.

(21) Appl. No.: 15/649,450

(22) Filed: Jul. 13, 2017

(65) Prior Publication Data
US 2018/0024809 A1    Jan. 25, 2018

(30) Foreign Application Priority Data

Jul. 19, 2016 (EP) .................................... 16180173

(51) Int. Cl.
G06F 3/16 (2006.01)
H04R 3/00 (2006.01)
H04R 1/40 (2006.01)
(52) U.S. Cl.
CPC ............ G06F 3/165 (2013.01); H04R 1/406 (2013.01); H04R 3/005 (2013.01)
(58) Field of Classification Search
CPC ...................................................... G06F 3/165
See application file for complete search history.

(56) References Cited

U.S. PATENT DOCUMENTS

| 4,893,289 A * | 1/1990 | Greenwood ........... G01V 1/001 367/129 |
| 6,295,014 B1 | 9/2001 | Eastty et al. |
| 2003/0031262 A1* | 2/2003 | Watanabe ............ H04B 14/062 375/247 |
| 2003/0151535 A1 | 8/2003 | Melanson et al. |
| 2008/0019548 A1 | 1/2008 | Avendano |
| 2008/0260175 A1 | 10/2008 | Elko |
| 2012/0213389 A1 | 8/2012 | Imai |
| 2013/0117016 A1 | 5/2013 | Ruwisch |
| 2014/0132304 A1 | 5/2014 | Haiut |
| 2014/0193000 A1 | 7/2014 | Ruwisch |

FOREIGN PATENT DOCUMENTS

| EP | 1744174 A | 1/2007 |
| GB | 2276495 A | 12/1992 |

OTHER PUBLICATIONS

Extended European Search Report issued for European Patent Application No. 16 180 173.3, dated Jan. 24, 2017, 10 pages.

* cited by examiner

Primary Examiner — Duc Nguyen
Assistant Examiner — Phan Le
(74) Attorney, Agent, or Firm — Sprinkle IP Law Group

(57) ABSTRACT

An audio signal processor generating an analog audio signal with directional characteristic from at least two 1-bit audio signals of digital microphones comprises a shift register of length n for bit-clocked throughput of at least one 1-bit audio signal and a combiner for combining at least two 1-bit audio signals to an interlaced 1-bit audio signal with doubled bit frequency.

20 Claims, 4 Drawing Sheets

AUDIO SIGNAL PROCESSOR

CROSS-REFERENCE TO RELATED APPLICATION(S)

This application claims a benefit of priority from European Patent Application No. 16180173.3, filed on Jul. 19, 2016, entitled "AUDIO SIGNAL PROCESSOR," which is fully incorporated by reference herein.

BACKGROUND OF THE INVENTION

1. Field of the Invention

The invention relates to audio signal processing and more particular to systems and methods for generating an analog audio signal from digital microphone signals and in particular to an audio signal processor for the creation of an analog microphone signal with directional characteristic from 1-bit signals of at least two digitally ported microphones.

2. Description of Related Art

Methods of using one or more microphones with omni-spatial characteristic creating a signal with directional spatial characteristic are well known the art and often called shift and add linear beamforming. Also, non-linear methods with increased beamforming efficiency have been disclosed, e.g., in US 20080019548 A1, US20130117016 A1, US20080260175 A1, and US20140193000 A1. However, all of these methods require a capable signal processor carrying out sophisticated mathematical operations.

Digital 1-bit audio signals are known. However, audio signal processing based on 1-bit signals is limited, so far, to rather simple signal manipulation like volume control as described in US 20030151535 A1, or require a transformation into n-bit signals (n>1) for applying digital signal processing, and wherein the 1-bit signal itself is only used for signal transport as described in U.S. Pat. No. 6,295,014 B1.

Digital microphones with 1-bit pulse-density-modulated PDM output are known. Usually, these microphones are constructed in Micro Electro Mechanical System (MEMS) technology and have omni-spatial characteristic, i.e., no preferred direction of sound reception. The signals of such digital microphones supplying a digital audio system are often also required in analog audio systems, where a directional microphone characteristic is required, e.g., in order to improve the signal-to-noise ratio of a desired sound source, e.g., a human speaker in a running car conducting hands-free communication.

Thus, there is a need for improved audio signal processing based on 1-bit microphone signals. Furthermore, there is a need for audio signal processing with reduced computational effort. The invention disclosed herein can address these needs and more.

SUMMARY OF THE INVENTION

It is therefore an object to provide an audio signal processor being capable of generating an analog audio signal with directional characteristic from at least two 1-bit audio signals of digital microphones which does not require sophisticated mathematical operation, time-frequency domain transformations and thus a complex digital signal processor (DSP) for such kind of complex operation.

An apparatus and method are disclosed that generate an analog audio signal with directional characteristic from at least two 1-bit audio signals generated by respective digital microphones, wherein the apparatus comprises a shift register of length n for bit-clocked throughput of at least one 1-bit audio signal and a combiner for combining at least two 1-bit audio signals to an interlaced 1-bit audio signal with doubled bit frequency.

In one aspect, the apparatus can be an audio signal processor that generates the analog audio signal with directional characteristic from the two or more 1-bit audio signals provided by the digital microphones. Linear shift and add beamforming of the 1-bit digital audio signals is carried out by means of a serial shift register and a combiner, the latter producing a 1-bit audio signal with doubled bit frequency as interlaced signal of a first digital microphone signal being put through said serial shift register and an optionally inverted second 1-bit microphone signal. In the audio signal processor all required processing steps are carried out with Boolean logical elements and filters, whereas in a preferred embodiment also the filters consist of digital gates, so that all active elements of the audio processor can be implemented by digital logic, and implementation of the audio signal processor in a device is very inexpensive, requires less and only simple digital circuitry and thus is less power consuming compared to complex DSP circuits by using standard digital logical circuits.

In general, there are provided methods, systems, and apparatus, including computer programs encoded on a computer readable medium for generating of an analog audio signal with directional characteristic from 1-bit signals of at least two digital microphones.

BRIEF DESCRIPTION OF THE DRAWINGS

The above and other objects, features and advantages of aspects of the invention will be apparent from the following detailed description of illustrative embodiments which is to be read in connection with the accompanying drawings, in which.

Like reference numbers and designations in the various drawings indicate like elements.

DESCRIPTION OF THE PREFERRED EMBODIMENTS

Figure 1:
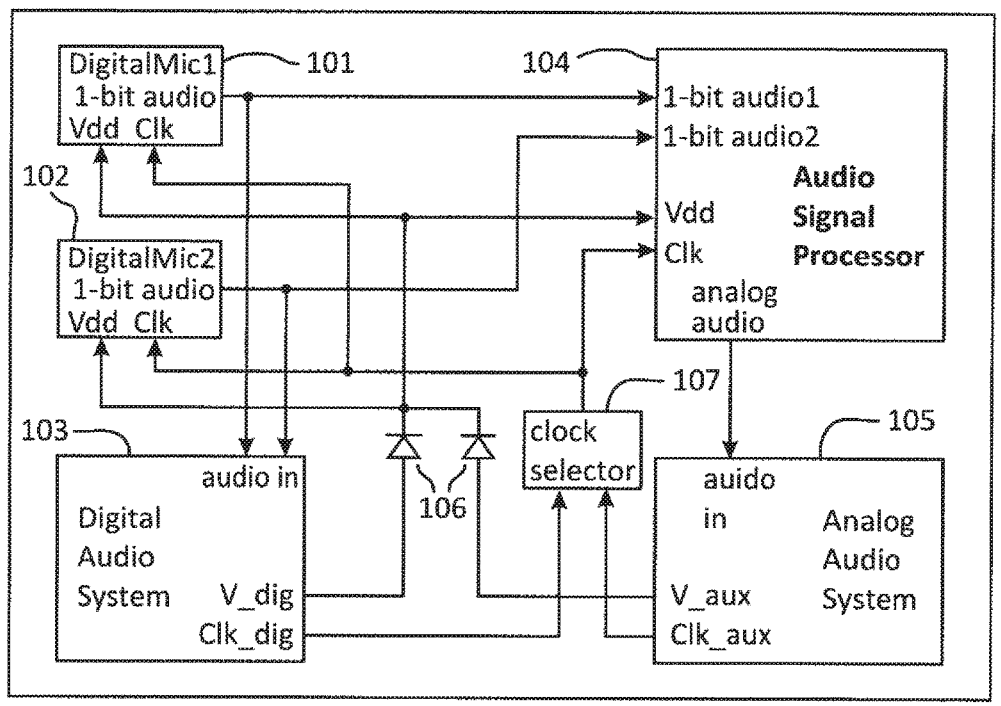
FIG. 1 shows a block diagram of an audio system 100 with the audio signal processor 104 according to an exemplary embodiment of the invention. There are provided two digital microphones 101, 102, each delivers a 1-bit audio signals to both the audio signal processor 104 and a digital audio system 103, and the audio signal processor 104 delivers an analog audio signal to an analog audio system 105.

According to an embodiment as shown in FIG. 1, the audio signal processor 104 as part of an audio system 100 generates an analog audio signal with directional characteristic. This directional audio signal with, e.g., cardioid spatial characteristic is generated by the audio signal processor from the signals of two digital microphones 101, 102 sharing the same bit clock, which are mounted in a spatial distance d, e.g., d=10 mm. Within the audio signal processor, the signal of the first digital microphone 101 is delayed by d/c milliseconds, where c is the speed of sound 340 m/s at room temperature, and subtracted from the second, un-delayed microphone 102 signal.

The audio sample rate shall be 48 kHz as it is common in digital audio systems, and the typical oversampling factor 64 of a 1-bit audio signal shall be used, i.e., the bit clock of 1-bit audio signals of the digital microphone is f=3072 MHz.

According to an embodiment, said time delay is achieved by a serial-in serial-out Boolean shift register 201 of length n=fd/c n=90 in the given example, which is clocked by the bit clock of the 1-bit audio signals, the so called single bit clock frequency. Said shift register 201 delays the 1-bit audio signal of said first digital microphone 101. Subtraction is realized by means of a combiner 202 and preferably an inverter 203, the latter providing an inverted 1-bit microphone signal. Both delayed and inverted signals are then combined to an interlaced 1-bit signal with doubled bit clock 2f=6144 MHz in the given example, which is provided by a clock multiplier 204.

Said interlaced signal is composed of alternating bits of the delayed first and the second microphone signal creating the so-called 1-bit audio output signal which forms a first analog audio signal. According to an embodiment and as further described below, the second microphone signal can also be inverted before combined with the delayed first microphone signal influencing the directional characteristic of the analog audio signal.

The first analog audio signal comprises the interlaced bits with doubled bit clock as produced by the combiner. Assigning the digital values 0 and 1 of this signal to voltage levels e.g., at an output pin of the audio processor (e.g., "0"=0V, "1"=1.8V), the voltage level at the output pin is physically an analog signal, which quickly changes between said voltage levels. Like any analog signal this unfiltered analog audio signal can be further processed by e.g., suitable filters.

According to an embodiment, the interlaced 1-bit audio output signal produced by the combiner will then be filtered by the output filter to produce a filtered analog audio signal with respective directional characteristic. According to an embodiment, the output filter is a suitable low-pass filter filtering out respective undesired out-of-band components, which do not contribute to the audible frequency range of the interlaced 1-bit audio output signal in the interlaced 1-bit audio output signal. If the second microphone signal is inverted before combined with the delayed first microphone signal the (filtered) analog audio signal has a respective cardioid spatial characteristic. According to an example, the band edge of said low pass filter should be chosen not higher than 48 kHz, in the given preferred example preferably not higher than 24 kHz in order to avoid spatial aliasing, but can also be set to an even lower frequency depending on the requirements of the analog audio system.

According to an alternative example, said inverter 203 can also invert the delayed signal of the first microphone 101 instead of the un-delayed second microphone 102. Different directional characteristics, e.g., hyper-cardioid of super-cardioid can be achieved with different, suitable shift register 201 length n. The exact value of n depends on the desired angular direction of maximum attenuation and the audio sample rate and the microphone distance, as well as the speed of sound which is usually treated as a constant although it varies with atmospheric conditions.

Figure 2:
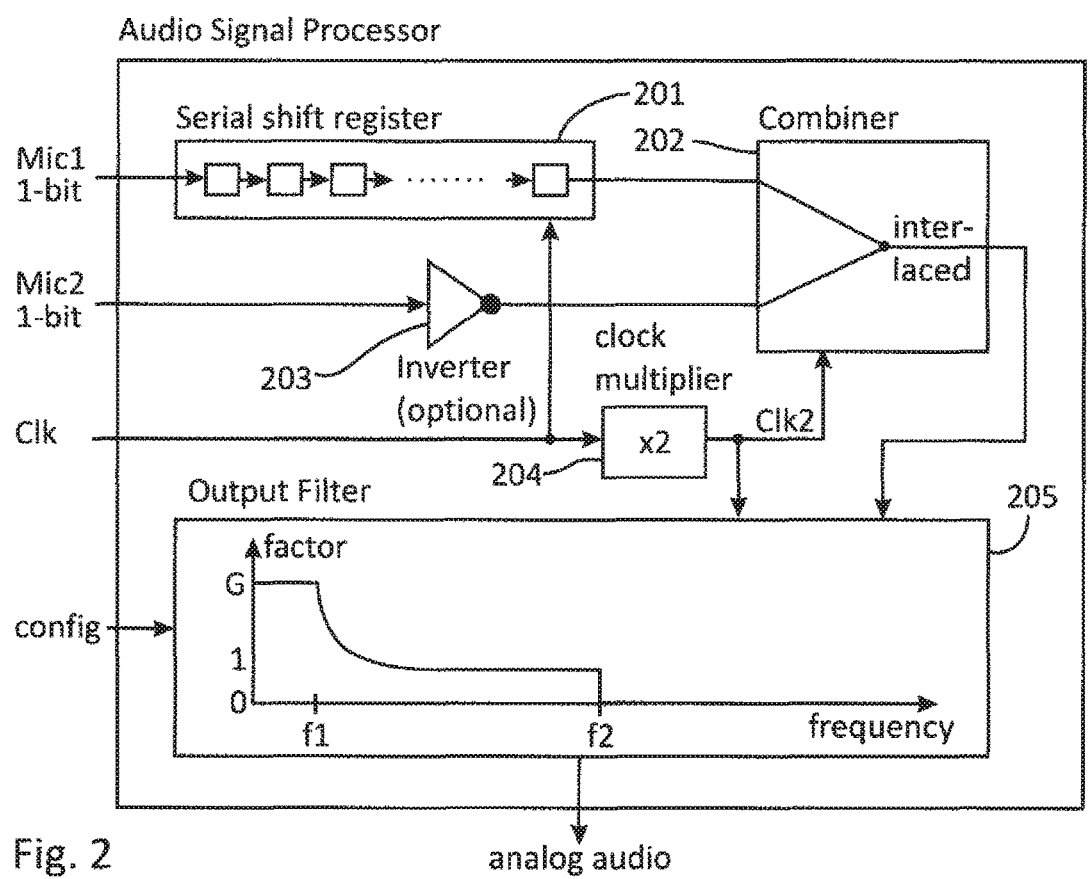
FIG. 2 shows a block diagram with a more detailed view of an exemplary embodiment of the audio signal processor 104. A first 1-bit digital audio signal is processed through a serial shift register 201 and forwarded to a combiner 202, where it is combined with the second 1-bit audio signal to an interlaced 1-bit signal with doubled bit clock frequency, which is provided by a clock multiplier 204. The second 1-bit audio signal is optionally inverted by an inverter 203 exploiting destructive interference yielding attenuation in a certain direction. If the inverter is omitted, constructive interference is exploited leading to signal enhancement in a certain direction. The interlaced 1-bit audio signal is filtered by an output filter 205 that outputs a filtered analog audio signal.

Furthermore, the inverter 203 can also be omitted, then the resulting directional characteristic is not cardioid or similar, see above, instead constructive interference is exploited, resulting in a signal enhancement of up to 6 dB in a preferred direction, for an array of two microphones. The embodiment without inverter is suitable for cascading more than two microphones with additional shift registers forming a phased array. Interlacing more than two shifted microphone signals will increase the bit clock of the interlaced signal by a factor equal to the number of microphones in the phased array If the input stage of an analog audio system, where the analog output signal of the audio signal processor is supplied to, has built-in low pass filters or intrinsic low-pass characteristic, then a low pass filter 205 is not necessarily required as part of the audio signal processor. It is, however, preferable to integrate said filter into the audio signal processor 104, which is referred to as output filter 205 in the following. This output filter 205 can be designed as combination of a standard low pass filter with cutoff frequency f2, e.g., f2=12 kHz, and a filter that compensates the frequency-specific signal attenuation of the beamformer at lower frequencies sometimes referred to as shelving filter. Compensation should be limited to a maximum Gain G which is reached at limit frequency f1, e.g., f1=100 Hz, otherwise the signal-to-noise ratio tends to degrade. With the above guideline the output filter can be designed as FIR Finite Impulse Response filter with standard filter design skills, and an exemplary transfer function of such output filter is sketched in the box 205 for the output filter in FIG. 2.

Figure 3:
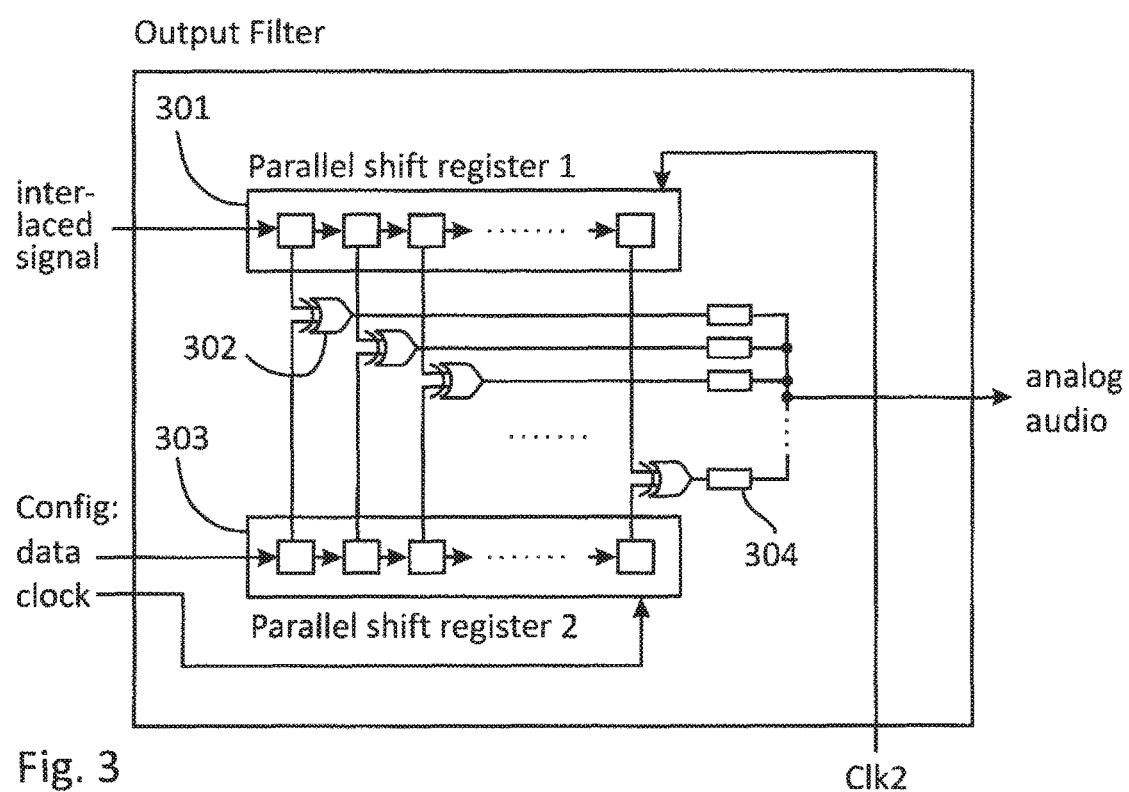
FIG. 3 shows a block diagram of an implementation of the output filter 205, which contains two serial-in parallel-out shift registers 301, 303 of length m, whereas shift register 301 throughputs said interlaced 1-bit signal, and shift register 303 holds a static bit pattern that can be loaded via a configuration interface clock and data. Bits at identical positions of both shift registers 301 and 303 are combined by logical exclusive- or XOR gates 302, and outputs of all said XOR gates are connected via resistors 304 averaging the outputs of the XOR gates and providing an analog audio signal, which is the output of the audio signal processor 104.

In an exemplary embodiment, all active components of said output filter 205 are digital i.e., Boolean, so production of the complete audio signal processor is cheap and simple. Such output filter 205 consists of two serial-in parallel-out shift registers 301, 303 of length m referred to as "parallel shift registers" or "second and third shift register" in the following as shown in FIG. 3. The interlaced signal is dynamically put through the second shift register 301 with bit clock 2f. Third shift register 303 holds a bit pattern, which is the 1-bit representation of a desired FIR filter as outlined above, whereas the oversampling factor of this 1-bit representation is twice of the oversampling factor of the 1-bit signals of the digital microphones 128 in the given example.

According to an exemplary embodiment, if a desired FIR filter requires, e.g., 13 taps, then the length m of the parallel shift registers 301, 303 is m=1664. Third shift register 303 can be hard-coded with said static bit pattern; however, in a preferred embodiment there is a configuration interface comprising a config-clock signal and a config-data signal. By this means, said static bit pattern can be loaded into said third shift register 303.

Each of the m stages of both parallel shift registers 301, 303 are input to a logical Exclusive-Or XOR Gate 302, and the outputs of all m XOR Gates are connected via m resistors 304 with a resistor value of e.g. 1M Ohm. The resistors 304 carry out the average over the output states of the m XOR-gates 302, producing an analog audio signal as output of the audio signal processor 104.

As shown in FIG. 1, the audio system 100 further comprises an analog audio system 105 which is a typical sink of the analog output signal of the audio signal processor 104, and in an embodiment where the analog audio system is the only audio sink in the application, both clock signal clk and supply voltage Vdd for the audio signal processor 104 as well as the digital microphones 101, 102 are provided by the analog audio system 105. However, a typical deployment of the audio signal processor is an application, where a digital audio system 103 is directly processing the digital signals of the digital microphones 101, 102. Then, the digital audio system 103 provides the clock signal and also power supply for the digital microphones 101, 102, and in such an embodiment the audio signal processor 104 gets its clock signal clk from the digital audio system 103, and not from the analog audio system 105 where the analog output signal goes to.

In an embodiment, in which the analog audio system 105 is a safety-relevant component, e.g., an automatic emergency call e-call system in a vehicle, the audio signal processor 104 must maintain operation even in case the digital audio system ceased operation, e.g., due to an accident. In a preferred embodiment, operation of the audio signal processor 104 and also of the digital microphones 101, 102 is secured by an alternative supply of both power and clock from the digital audio system 103 and from the analog audio system 105 as backup. Alternative power supply can be realized by means of a pair of diodes 106, as shown in FIG. 1, although more complex switches are also possible. Alternative clock supply of the audio signal processor 104 and the digital microphones 104 is realized by means of a clock selector 107, that outputs the clock signal clk_dig provided by the digital audio system 103 in case it is a valid clock signal, and clk_analog that is provided by the analog audio system 105 otherwise. The output of the clock selector is the clock signal of both audio signal processor 104 and digital microphones 101, 102. By this means it is guaranteed that digital microphones 101, 102 and audio signal processor 104 are being synchronously clocked and powered in any case, with or without an operational digital audio system 103.

Figure 4:
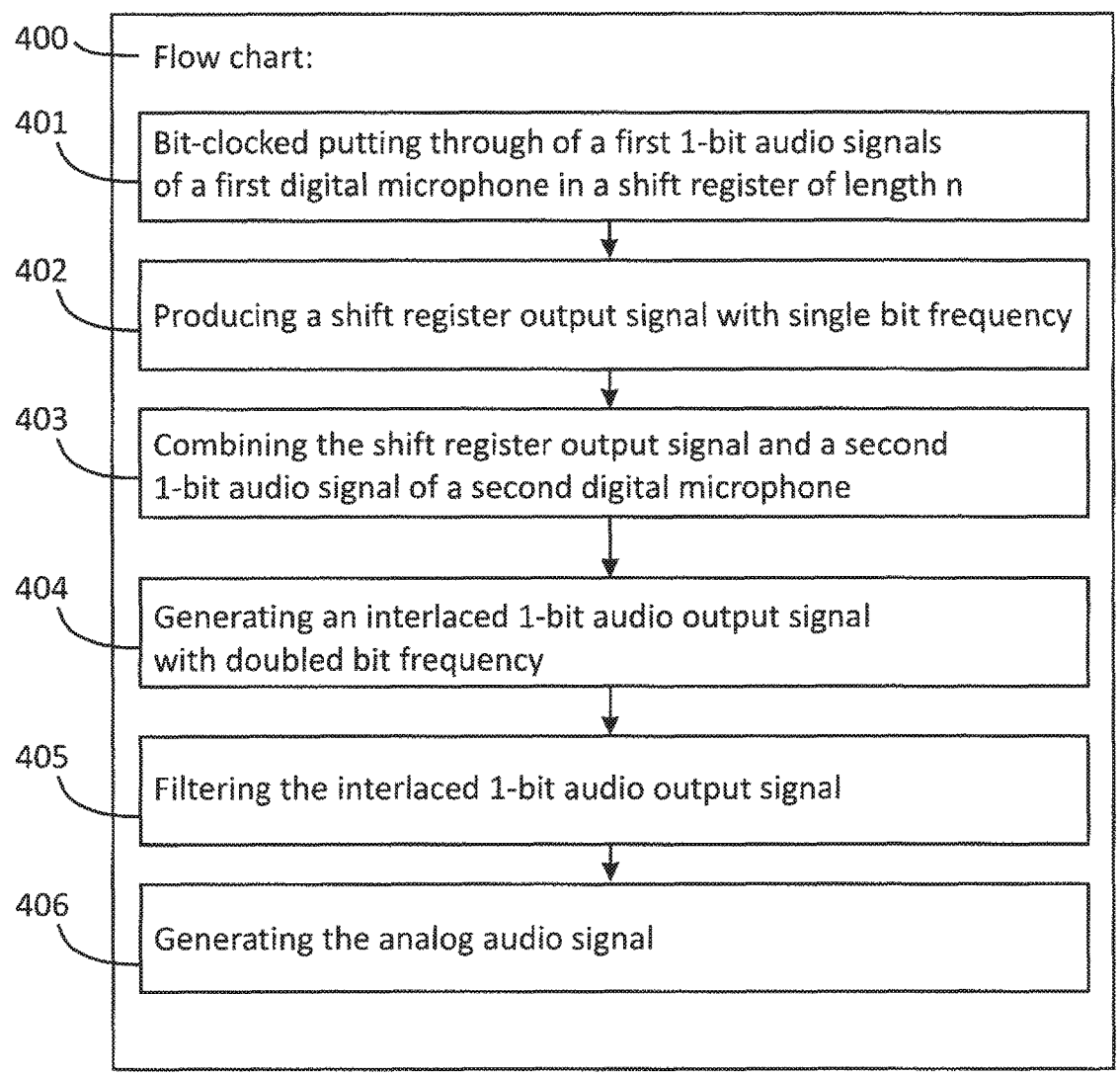
FIG. 4 shows a flow diagram of a method 400 according to an exemplary embodiment.

FIG. 4 shows an exemplary embodiment of a method 400 for generating the analog audio signal with directional characteristic from at least two 1-bit audio signals of digital microphones as described above. The method comprises a bit-clocked putting through 410 of a first 1-bit audio signal of the first digital microphone 101 in the shift register of length n 201 and producing 420 a shift register output signal with single bit frequency. In step 430 the shift register output signal is combined with the second 1-bit audio signal of the second digital microphone 102 by the combiner 202 to generate 440 an interlaced 1-bit audio output signal with doubled bit frequency. In step 450, the interlaced 1-bit audio output signal is filtered in output filter 205 to generate 460 the analog audio signal.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

The operations described in this specification can be implemented as operations performed by a data processing apparatus on data stored on one or more computer-readable storage devices or received from other sources.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Although the above discussion discloses various exemplary embodiments of the invention, it should be apparent that those skilled in the art can make various modifications that will achieve some of the advantages of the invention without departing from the true scope of the invention.

The invention claimed is:

1. An audio signal processor for generating an analog audio signal with directional characteristic from at least two pulse-density-modulated 1-bit audio signals of digital microphones, the audio signal processor comprising:
   a first shift register of length n, n>0, being adapted to bit-clocked put through of a first pulse-density-modulated 1-bit audio signal of a first digital microphone to produce a first shift register output signal with single bit clock frequency; and
   a combiner being adapted to combine the shift register output signal and a second pulse-density-modulated 1-bit audio signal of a second digital microphone to generate an interlaced 1-bit audio output signal with double bit clock frequency, wherein the interlaced 1-bit audio output signal forms the analog audio signal.

2. The audio signal processor of claim 1, further comprising an output filter being adapted to filter the analog audio signal to generate a filtered analog audio signal.

3. The audio signal processor of claim 1, wherein the length n of the first shift register is defined such that it is adapted to determine the directional characteristic of the analog audio signal.

4. The audio signal processor of claim 1, further comprising at least one of:
a clock multiplier being adapted to double the single bit clock frequency to produce the double bit clock frequency; or
an inverter being adapted to invert the second pulse-density-modulated 1-bit audio signal and wherein the combiner receives the inverted second pulse-density-modulated 1-bit audio signal.

5. The audio signal processor of claim 1, wherein the output filter is adapted to alter said interlaced 1-bit audio output signal into a bandwidth-limited analog audio signal.

6. The audio signal processor of claim 5, wherein the output filter comprises a second shift register and a third shift register both with length m, whereas said second shift register is adapted to throughput said interlaced 1-bit audio output signal, and said third shift register comprises a static bit pattern being a 1-bit representation of an impulse response function of a desired filter, whereas any two bits of same positions p, p=1 . . . m, in said second and third shift registers are combined by m logical exclusive-or XOR gates, and the outputs of the m XOR gates are connected to an averaging unit providing said analog audio signal.

7. The audio signal processor of claim 6, further comprising a configuration interface comprising a configuration clock and at least one configuration data line, wherein said static bit pattern is loadable into said third shift register over the configuration data lines at the configuration clock.

8. The audio signal processor of claim 6, where the outputs of the m XOR gates are connected through resistors, and said resistors are connected forming said averaging unit providing said analog audio signal.

9. The audio signal processor of claim 1, comprising a clock selector being adapted to select one of at least two input clock signals for clocking the audio signal processor and the first and second digital microphones.

10. The audio signal processor of claim 9, where said clock selector is adapted to select a first input clock signal if said first clock signal is a valid clock signal, and select a second clock signal otherwise.

11. The audio signal processor of claim 10, wherein the analog audio signal is delivered to an analog audio system, wherein said pulse-density-modulated 1-bit signals of said digital microphones are shared with a digital audio system that provides said first clock signal and supply voltage to the audio signal processor, wherein both alternative supply voltage and said second clock signal are provided by said analog audio system supplying the audio signal processor in case the digital audio system breaks down.

12. An audio system comprising:
a first digital microphone;
a second digital microphone;
an audio signal processor comprising:
a first shift register of length n, n>0, being adapted to bit-clocked put through of a first pulse-density-modulated 1-bit audio signal of the first digital microphone to produce a first shift register output signal with single bit clock frequency; and
a combiner being adapted to combine the shift register output signal and a second pulse-density-modulated 1-bit audio signal of the second digital microphone to generate an interlaced 1-bit audio output signal with double bit clock frequency,
wherein the interlaced 1-bit audio output signal forms an analog audio signal;
a digital audio system receiving the first and second pulse-density-modulated 1-bit audio signals of the first and second digital microphones; and
an analog audio system receiving the analog output signal from the audio signal processor.

13. The system of claim 12, further comprising:
a clock selector providing a clock signal to the audio signal processor with the single bit clock frequency, wherein the clock signal is received from the digital audio system or from the analog audio system, wherein said digital audio system is adapted to provide a supply voltage to the audio signal processor, and wherein said analog audio system is adapted to provide the supply voltage to the audio signal processor in case the digital audio system is not operating.

14. The system of claim 12, wherein the length n of the first shift register of the audio signal processor is defined such that it is adapted to determine the directional characteristic of the analog audio signal.

15. A method for generating an analog audio signal with directional characteristic from at least two pulse-density-modulated 1-bit audio signals of digital microphones, comprising:
at an audio signal processor, bit-clocked putting through of a first pulse-density-modulated 1-bit audio signals of a first digital microphone in a shift register of length n, n>0, and producing a shift register output signal with single bit frequency;
combining the shift register output signal and a second pulse-density-modulated 1-bit audio signal of a second digital microphone and generating an interlaced 1-bit audio output signal with doubled bit frequency;
filtering the interlaced 1-bit audio output signal; and
generating the analog audio signal.

16. The method according to claim 15, further comprising:
providing, by a clock selector, a clock signal to the audio signal processor with the single bit clock frequency, wherein the clock signal is received from a digital audio system or from an analog audio system, wherein said digital audio system is adapted to provide a supply voltage to the audio signal processor, and wherein said analog audio system is adapted to provide the supply voltage to the audio signal processor in case the digital audio system is not operating.

17. The method according to claim 15, wherein the length n of the first shift register of the audio signal processor is defined such that it is adapted to determine the directional characteristic of the analog audio signal.

18. A computer program product comprising at least one non-transitory computer-readable medium storing instructions which when executed by a data processing device perform:
at an audio signal processor, bit-clocked putting through of a first pulse-density-modulated 1-bit audio signals of a first digital microphone in a shift register of length n, n>0, and producing a shift register output signal with single bit frequency;

combining the shift register output signal and a second pulse-density-modulated 1-bit audio signal of a second digital microphone and generating an interlaced 1-bit audio output signal with doubled bit frequency;

filtering the interlaced 1-bit audio output signal; and generating the analog audio signal.

19. The computer program product of claim 18, wherein the instructions when executed by a data processing device further perform:

providing a clock signal to the audio signal processor with the single bit clock frequency, wherein the clock signal is received from a digital audio system or from an analog audio system, wherein said digital audio system is adapted to provide a supply voltage to the audio signal processor, and wherein said analog audio system is adapted to provide the supply voltage to the audio signal processor in case the digital audio system is not operating.

20. The computer program product of claim 18, wherein the length n of the first shift register of the audio signal processor is defined such that it is adapted to determine the directional characteristic of the analog audio signal.

* * * * *